United States Patent
Lee et al.

(10) Patent No.: US 10,117,273 B2
(45) Date of Patent: Oct. 30, 2018

(54) COMMUNICATION BETWEEN MAC AND PHY FOR PARALLEL RANDOM ACCESS PROCEDURES OF DUAL CONNECTIVITY

(71) Applicant: LG ELECTRONICS INC., Seoul (KR)

(72) Inventors: Sunyoung Lee, Seoul (KR); Seungjune Yi, Seoul (KR); Sungjun Park, Seoul (KR); Youngdae Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 104 days.

(21) Appl. No.: 15/023,649

(22) PCT Filed: Sep. 4, 2014

(86) PCT No.: PCT/KR2014/008313
§ 371 (c)(1),
(2) Date: Mar. 21, 2016

(87) PCT Pub. No.: WO2015/046781
PCT Pub. Date: Apr. 2, 2015

(65) Prior Publication Data
US 2016/0212770 A1    Jul. 21, 2016

Related U.S. Application Data

(60) Provisional application No. 61/881,453, filed on Sep. 24, 2013.

(51) Int. Cl.
*H04W 74/08* (2009.01)
*H04B 7/26* (2006.01)
(Continued)

(52) U.S. Cl.
CPC ...... *H04W 74/0833* (2013.01); *H04B 7/2612* (2013.01); *H04L 69/324* (2013.01); *H04W 56/00* (2013.01)

(58) Field of Classification Search
CPC  H04W 74/0833; H04W 56/00; H04L 69/324; H04B 7/2612
See application file for complete search history.

(56) References Cited

U.S. PATENT DOCUMENTS

2007/0047486 A1* 3/2007 Lee .................. H04W 74/002
                                                          370/329
2008/0194259 A1* 8/2008 Vujcic ............... H04W 74/0866
                                                          455/435.1
(Continued)

FOREIGN PATENT DOCUMENTS

CN        101248699        8/2008
CN        101946424        1/2011
(Continued)

OTHER PUBLICATIONS

PCT International Application No. PCT/KR2014/008313, Written Opinion of the International Searching Authority dated Jan. 5, 2016, 11 pages.
(Continued)

*Primary Examiner* — Alex Skripnikov
*Assistant Examiner* — Wilfred Thomas
(74) *Attorney, Agent, or Firm* — Lee Hong Degerman Kang Waimey

(57) ABSTRACT

The present invention relates to a communication between MAC layer entity and PHY layer entity for parallel random access procedures of dual connectivity. In this scheme, a first PHY entity of a user equipment informs a failure of a random access preamble transmission to a first MAC entity of the UE. Then, the first MAC entity continues or stops a random access procedure without performing procedures for a random access failure.

7 Claims, 13 Drawing Sheets

(51) Int. Cl.
*H04L 29/08* (2006.01)
*H04W 56/00* (2009.01)

(56) References Cited

U.S. PATENT DOCUMENTS

| | | | |
|---|---|---|---|
| 2009/0116468 A1 | 5/2009 | Zhang et al. | |
| 2011/0305197 A1 | 12/2011 | Park et al. | |
| 2012/0002555 A1 | 1/2012 | Ohuchi et al. | |
| 2012/0257510 A1* | 10/2012 | Jeong | H04L 5/0098 370/242 |
| 2013/0039294 A1 | 2/2013 | Wang | |
| 2013/0188473 A1 | 7/2013 | Dinan | |
| 2014/0056243 A1* | 2/2014 | Pelletier | H04W 74/04 370/329 |
| 2014/0198729 A1 | 7/2014 | Bostrom et al. | |
| 2015/0334669 A1 | 11/2015 | Zhang et al. | |

FOREIGN PATENT DOCUMENTS

| | | |
|---|---|---|
| CN | 102349349 | 2/2012 |
| JP | 2009201114 | 9/2009 |
| JP | 2011508561 | 3/2011 |
| KR | 1020090131650 | 12/2009 |
| KR | 1020130036362 | 4/2013 |
| RU | 2464741 | 10/2012 |
| WO | 2010093111 | 8/2010 |
| WO | 2011153701 | 12/2011 |
| WO | 2013042908 | 3/2013 |
| WO | 2013126843 | 8/2013 |

OTHER PUBLICATIONS

PCT International Application No. PCT/KR2014/008314, Written Opinion of the International Searching Authority dated Jan. 5, 2015, 9 pages.
LG Electronics, "RAN1 issues for support of dual connectivity with small cell", R1-132240, 3GPP TSG RAN WG1 #73, May 2013, 5 pages.
NEC Group, "Physical layer aspects for dual layer connectivity in small cells", R1-133345, 3GPP TSG RAN WG1 Meeting #74, Aug. 2013, 5 pages.
Russian Federation Federal Service for Intellectual Property, Patents and Trademarks Application Serial No. 2016111671/07, Notice of Allowance dated Feb. 20, 2017, 18 pages.
European Patent Office Application Serial No. 14847958.7, Search Report dated May 16, 2017, 7 pages.
United States Patent and Trademark Office U.S. Appl. No. 14/917,533, Office Action dated Jul. 3, 2017, 20 pages.
The State Intellectual Property Office of the People's Republic of China Application Serial No. 201480052718.3, Office Action dated Jan. 30, 2018, 24 pages.
United States Patent and Trademark Office U.S. Appl. No. 14/917,533, Final Office Action dated Feb. 8, 2018, 14 pages.

\* cited by examiner

FIG. 4
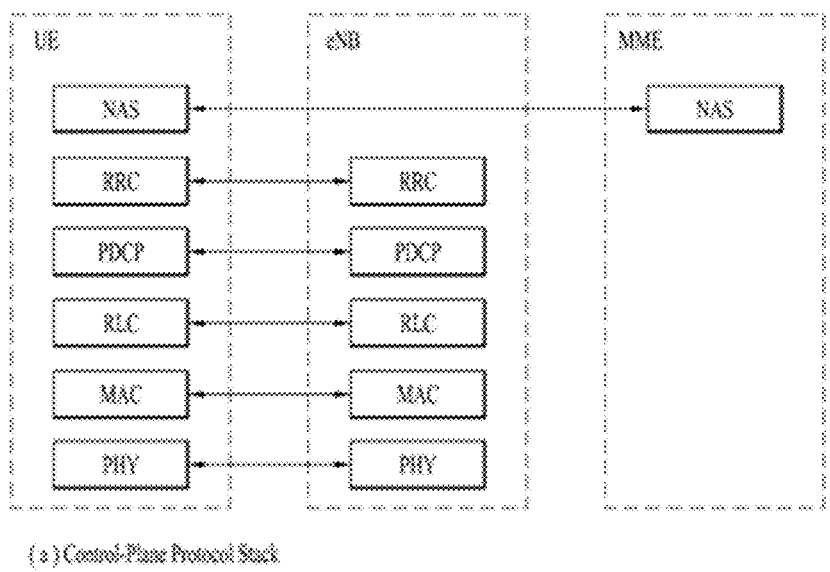
(a) Control-Plane Protocol Stack
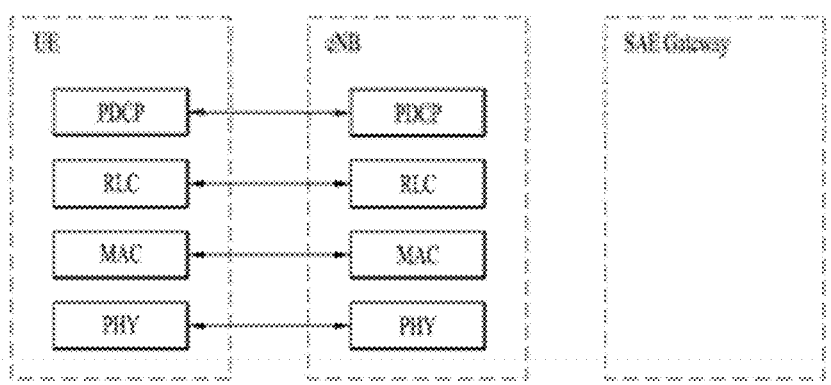
(b) User-Plane Protocol Stack
FIG. 5
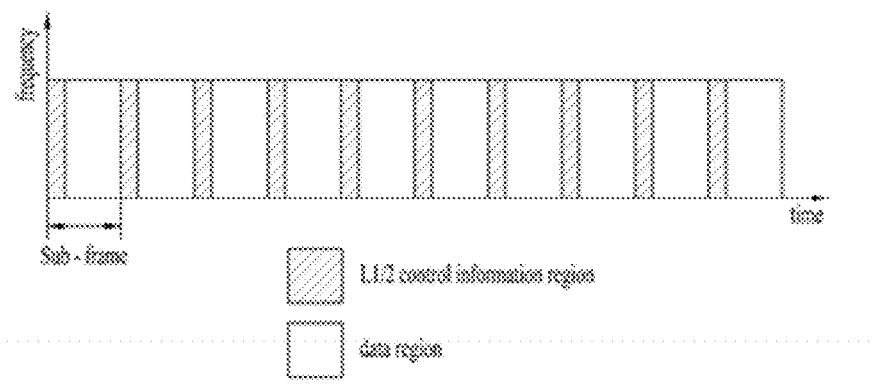

COMMUNICATION BETWEEN MAC AND PHY FOR PARALLEL RANDOM ACCESS PROCEDURES OF DUAL CONNECTIVITY

CROSS-REFERENCE TO RELATED APPLICATIONS

This application is the National Stage filing under 35 U.S.C. 371 of International Application No. PCT/KR2014/008313, filed on Sep. 4, 2014, which claims the benefit of U.S. Provisional Application No. 61/881,453, filed on Sep. 24, 2013, the contents of which are all hereby incorporated by reference herein in their entirety.

TECHNICAL FIELD

The present invention relates to a random access procedure in a wireless communication system and, more particularly, to methods for communication between MAC layer entity and PHY layer entity for parallel random access procedures of dual connectivity and devices therefor.

BACKGROUND ART

As an example of a mobile communication system to which the present invention is applicable, a 3rd Generation Partnership Project Long Term Evolution (hereinafter, referred to as LTE) communication system is described in brief.

FIG. 1 is a view schematically illustrating a network structure of an E-UMTS as an exemplary radio communication system. An Evolved Universal Mobile Telecommunications System (E-UMTS) is an advanced version of a conventional Universal Mobile Telecommunications System (UMTS) and basic standardization thereof is currently underway in the 3GPP. E-UMTS may be generally referred to as a Long Term Evolution (LTE) system. For details of the technical specifications of the UMTS and E-UMTS, reference can be made to Release 7 and Release 8 of "3rd Generation Partnership Project; Technical Specification Group Radio Access Network".

Referring to FIG. 1, the E-UMTS includes a User Equipment (UE), eNode Bs (eNBs), and an Access Gateway (AG) which is located at an end of the network (E-UTRAN) and connected to an external network. The eNBs may simultaneously transmit multiple data streams for a broadcast service, a multicast service, and/or a unicast service.

One or more cells may exist per eNB. The cell is set to operate in one of bandwidths such as 1.25, 2.5, 5, 10, 15, and 20 MHz and provides a downlink (DL) or uplink (UL) transmission service to a plurality of UEs in the bandwidth. Different cells may be set to provide different bandwidths. The eNB controls data transmission or reception to and from a plurality of UEs. The eNB transmits DL scheduling information of DL data to a corresponding UE so as to inform the UE of a time/frequency domain in which the DL data is supposed to be transmitted, coding, a data size, and hybrid automatic repeat and request (HARQ)-related information. In addition, the eNB transmits UL scheduling information of UL data to a corresponding UE so as to inform the UE of a time/frequency domain which may be used by the UE, coding, a data size, and HARQ-related information. An interface for transmitting user traffic or control traffic may be used between eNBs. A core network (CN) may include the AG and a network node or the like for user registration of UEs. The AG manages the mobility of a UE on a tracking area (TA) basis. One TA includes a plurality of cells.

Although wireless communication technology has been developed to LTE based on wideband code division multiple access (WCDMA), the demands and expectations of users and service providers are on the rise. In addition, considering other radio access technologies under development, new technological evolution is required to secure high competitiveness in the future. Decrease in cost per bit, increase in service availability, flexible use of frequency bands, a simplified structure, an open interface, appropriate power consumption of UEs, and the like are required.

DISCLOSURE

Technical Problem

An object of the present invention devised to solve the problem lies in the conventional mobile communication system. The technical problems solved by the present invention are not limited to the above technical problems and those skilled in the art may understand other technical problems from the following description.

Technical Solution

To achieve the object of the present invention, in one aspect, a method of communicating with a network at a user equipment (UE) in a wireless communication system is provided. This method comprises: informing, by a first physical layer (PHY) entity of the UE, a failure of a random access preamble transmission to a first MAC entity of the UE; and continuing or stopping, at the first MAC entity of the UE, a random access procedure without performing procedures for a random access failure.

The failure of the random access preamble transmission by the first PHY entity may be caused by another random access procedure of a second MAC entity of the UE.

An indication on the failure of the random access preamble transmission can be different from an indication on the random access procedure failure.

The procedures for the random access failure may include: incrementing a number of transmission of the random access preamble; determining whether the number of transmission of the random access preamble reaches to a maximum allowable number of transmission; and reporting the reach to the maximum allowable number of transmission to higher layer entity or concluding the random access procedure is unsuccessfully completed, if the number of transmission of the random access preamble reaches to the maximum allowable number of transmission; and reselecting a random access resource, if the number of transmission of the random access preamble does not reach to the maximum allowable number of transmission.

The above continuing the random access procedure may comprise: reselecting a random access resource without increasing a preamble transmission counter; and instructing the first PHY entity to transmit a random access preamble after predetermined time.

Here, the above continuing the random access procedure may be performed without increasing a transmission power for transmitting the random access preamble, since the preamble transmission counter is not increased.

The above stopping the random access procedure may comprise: flushing a HARQ buffer used for the transmission of the random access procedure. Here, the first MAC entity of the UE may restart the stopped random access procedure, when a second MAC entity of the UE informs the first MAC entity of a completion of another random access procedure by the second MAC entity.

The first MAC entity of the UE may be responsible for transferring data to a first base station and a second MAC entity of the UE may be responsible for transferring data to a second base station, where a first service area of the first base station is smaller than a second service area of the second base station.

In another aspect of the present invention, a user equipment (UE) communicating with a network in a wireless communication system is provided. This UE comprises: a transceiver configured to transmit and receive signals from a first base station and a second base station; a processor connected to the transceiver and comprising a first physical layer (PHY) entity and a first MAC entity, wherein the processor is configured to control the first PHY entity to inform a failure of a random access preamble transmission to the first MAC entity, and to control the first MAC entity to continue or stop a random access procedure without performing procedures for a random access failure.

The processor may further comprises: a second MAC entity and a second PHY entity, wherein the failure of the random access preamble transmission by the first PHY entity may be caused by another random access procedure of the second MAC entity.

The processor may be further configured to control the first MAC entity to reselect a random access resource without increasing a preamble transmission counter; and to instruct the first PHY entity to transmit a random access preamble after predetermined time, if the first MAC entity determines to continue the random access procedure.

Here, the processor may be further configured to control the first MAC entity to continue the random access procedure without increasing a transmission power for transmitting the random access preamble since the preamble transmission counter is not increased.

The processor may further comprise a HARQ buffer, and the processor may be further configured to control the first MAC entity to flush the HARQ buffer used for the transmission of the random access procedure, when the first MAC entity determines to stop the random access procedure.

The processor may be further configured to control the first MAC entity to restart the stopped random access procedure, when the second MAC entity of the UE informs the first MAC entity of a completion of another random access procedure by the second MAC entity.

It is to be understood that both the foregoing general description and the following detailed description of the present invention are exemplary and explanatory and are intended to provide further explanation of the invention as claimed.

Advantageous Effects

According to the present invention, parallel random access procedure to implement the dual connectivity of the UE would efficiently operate. Specifically, the UE can perform the random access procedure for SeNB with minimum interference with the random access procedure for MeNB.

It will be appreciated by persons skilled in the art that that the effects achieved by the present invention are not limited to what has been particularly described hereinabove and other advantages of the present invention will be more clearly understood from the following detailed description taken in conjunction with the accompanying drawings.

DESCRIPTION OF DRAWINGS

The accompanying drawings, which are included to provide a further understanding of the invention and are incorporated in and constitute a part of this application, illustrate embodiment(s) of the invention and together with the description serve to explain the principle of the invention.

FIG. 4 is a diagram showing a control plane and a user plane of a radio interface protocol between a UE and an E-UTRAN based on a 3GPP radio access network standard;

FIG. 5 is a view showing an example of a physical channel structure used in an E-UMTS system;

BEST MODE

Universal mobile telecommunications system (UMTS) is a 3rd Generation (3G) asynchronous mobile communication system operating in wideband code division multiple access (WCDMA) based on European systems, global system for mobile communications (GSM) and general packet radio services (GPRS). The long-term evolution (LTE) of UMTS is under discussion by the 3rd generation partnership project (3GPP) that standardized UMTS.

The 3GPP LTE is a technology for enabling high-speed packet communications. Many schemes have been proposed for the LTE objective including those that aim to reduce user and provider costs, improve service quality, and expand and improve coverage and system capacity. The 3GPP LTE requires reduced cost per bit, increased service availability, flexible use of a frequency band, a simple structure, an open interface, and adequate power consumption of a terminal as an upper-level requirement.

Hereinafter, structures, operations, and other features of the present invention will be readily understood from the embodiments of the present invention, examples of which are illustrated in the accompanying drawings. Embodiments described later are examples in which technical features of the present invention are applied to a 3GPP system.

Although the embodiments of the present invention are described using a long term evolution (LTE) system and a LTE-advanced (LTE-A) system in the present specification, they are purely exemplary. Therefore, the embodiments of the present invention are applicable to any other communication system corresponding to the above definition. In addition, although the embodiments of the present invention are described based on a frequency division duplex (FDD) scheme in the present specification, the embodiments of the present invention may be easily modified and applied to a half-duplex FDD (H-FDD) scheme or a time division duplex (TDD) scheme.

Figure 1:
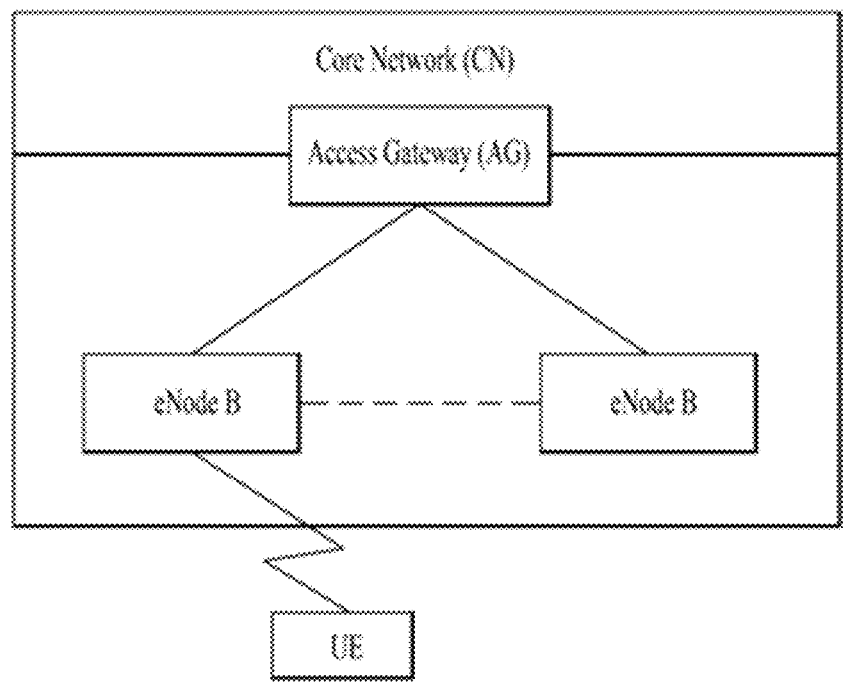
FIG. 1 is a diagram showing a network structure of an Evolved Universal Mobile Telecommunications System (E-UMTS) as an example of a wireless communication system.
Figure 2:
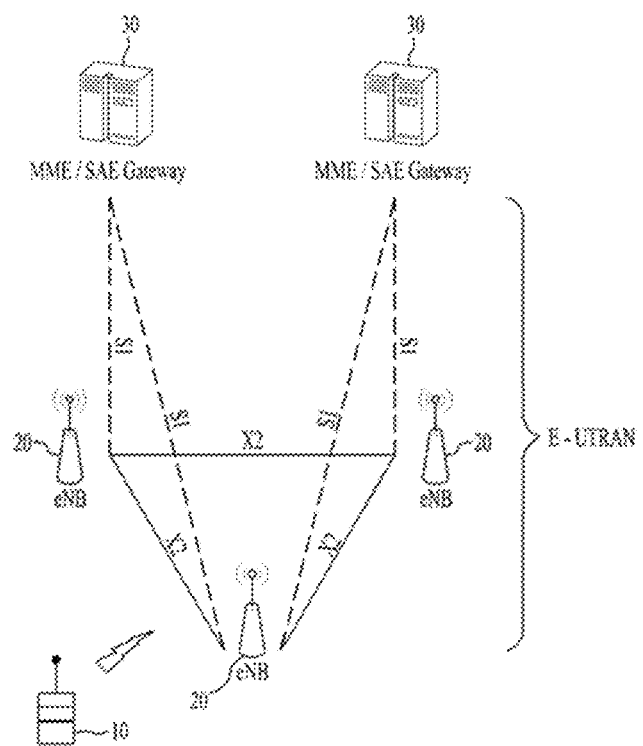
FIG. 2 is a block diagram illustrating network structure of an evolved universal mobile telecommunication system (E-UMTS).

FIG. 2 is a block diagram illustrating network structure of an evolved universal mobile telecommunication system (E-UMTS). The E-UMTS may be also referred to as an LTE system. The communication network is widely deployed to provide a variety of communication services such as voice (VoIP) through IMS and packet data.

As illustrated in FIG. 2, the E-UMTS network includes an evolved UMTS terrestrial radio access network (E-UTRAN), an Evolved Packet Core (EPC) and one or more user equipment. The E-UTRAN may include one or more evolved NodeB (eNodeB) 20, and a plurality of user equipment (UE) 10 may be located in one cell. One or more E-UTRAN mobility management entity (MME)/system architecture evolution (SAE) gateways 30 may be positioned at the end of the network and connected to an external network.

As used herein, "downlink" refers to communication from eNodeB 20 to UE 10, and "uplink" refers to communication from the UE to an eNodeB. UE 10 refers to communication equipment carried by a user and may be also referred to as a mobile station (MS), a user terminal (UT), a subscriber station (SS) or a wireless device.

Figure 3:
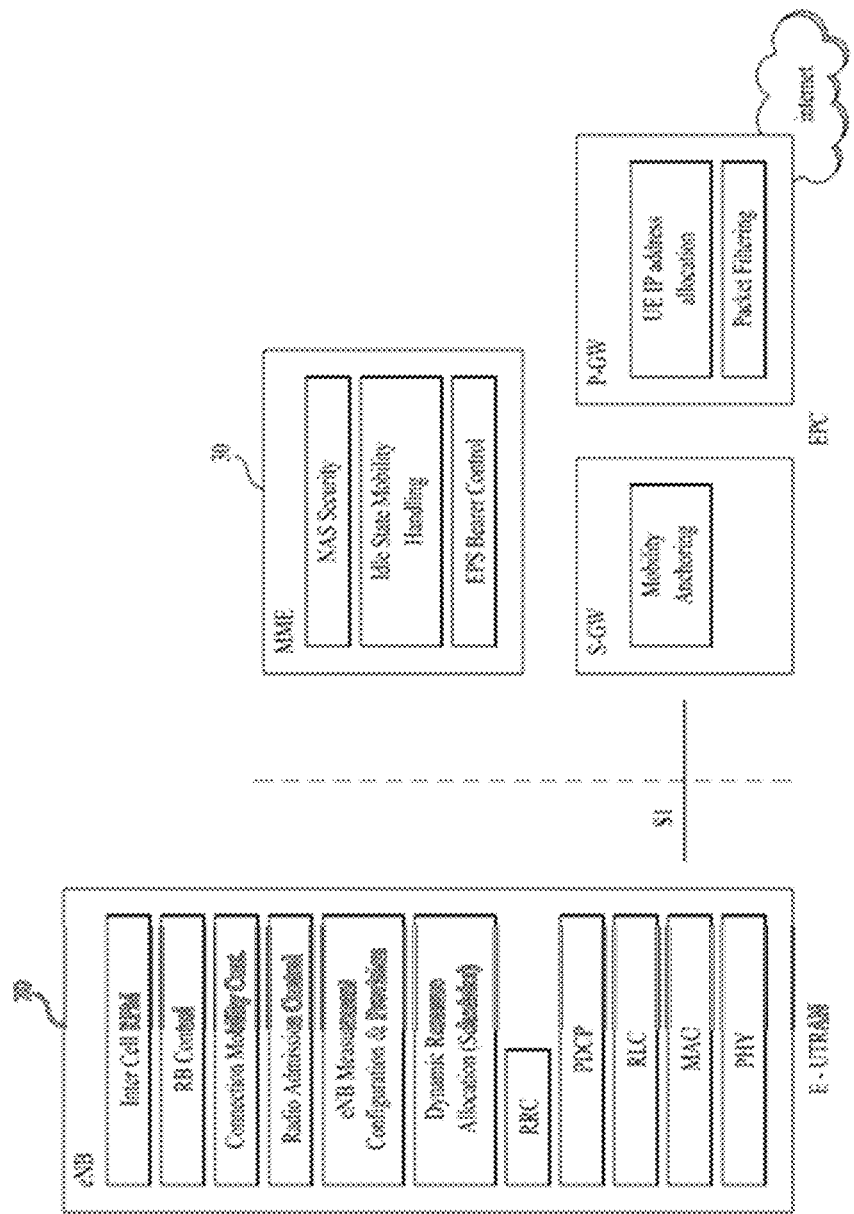
FIG. 3 is a block diagram depicting architecture of a typical E-UTRAN and a typical EPC.

FIG. 3 is a block diagram depicting architecture of a typical E-UTRAN and a typical EPC.

As illustrated in FIG. 3, an eNodeB 20 provides end points of a user plane and a control plane to the UE 10. MME/SAE gateway 30 provides an end point of a session and mobility management function for UE 10. The eNodeB and MME/SAE gateway may be connected via an S1 interface.

The eNodeB 20 is generally a fixed station that communicates with a UE 10, and may also be referred to as a base station (BS) or an access point. One eNodeB 20 may be deployed per cell. An interface for transmitting user traffic or control traffic may be used between eNodeBs 20.

The MME provides various functions including NAS signaling to eNodeBs 20, NAS signaling security, AS Security control, Inter CN node signaling for mobility between 3GPP access networks, Idle mode UE Reachability (including control and execution of paging retransmission), Tracking Area list management (for UE in idle and active mode), PDN GW and Serving GW selection, MME selection for handovers with MME change, SGSN selection for handovers to 2G or 3G 3GPP access networks, Roaming, Authentication, Bearer management functions including dedicated bearer establishment, Support for PWS (which includes ETWS and CMAS) message transmission. The SAE gateway host provides assorted functions including Per-user based packet filtering (by e.g. deep packet inspection), Lawful Interception, UE IP address allocation, Transport level packet marking in the downlink, UL and DL service level charging, gating and rate enforcement, DL rate enforcement based on APN-AMBR. For clarity MME/SAE gateway 30 will be referred to herein simply as a "gateway," but it is understood that this entity includes both an MME and an SAE gateway.

A plurality of nodes may be connected between eNodeB 20 and gateway 30 via the S1 interface. The eNodeBs 20 may be connected to each other via an X2 interface and neighboring eNodeBs may have a meshed network structure that has the X2 interface.

As illustrated, eNodeB 20 may perform functions of selection for gateway 30, routing toward the gateway during a Radio Resource Control (RRC) activation, scheduling and transmitting of paging messages, scheduling and transmitting of Broadcast Channel (BCCH) information, dynamic allocation of resources to UEs 10 in both uplink and downlink, configuration and provisioning of eNodeB measurements, radio bearer control, radio admission control (RAC), and connection mobility control in LTE_ACTIVE state. In the EPC, and as noted above, gateway 30 may perform functions of paging origination, LTE-IDLE state management, ciphering of the user plane, System Architecture Evolution (SAE) bearer control, and ciphering and integrity protection of Non-Access Stratum (NAS) signaling.

The EPC includes a mobility management entity (MME), a serving-gateway (S-GW), and a packet data network-gateway (PDN-GW). The MME has information about connections and capabilities of UEs, mainly for use in managing the mobility of the UEs. The S-GW is a gateway having the E-UTRAN as an end point, and the PDN-GW is a gateway having a packet data network (PDN) as an end point.

FIG. 4 is a diagram showing a control plane and a user plane of a radio interface protocol between a UE and an E-UTRAN based on a 3GPP radio access network standard.

The control plane refers to a path used for transmitting control messages used for managing a call between the UE and the E-UTRAN. The user plane refers to a path used for transmitting data generated in an application layer, e.g., voice data or Internet packet data.

A physical (PHY) layer of a first layer provides an information transfer service to a higher layer using a physical channel. The PHY layer is connected to a medium access control (MAC) layer located on the higher layer via a transport channel. Data is transported between the MAC layer and the PHY layer via the transport channel Data is transported between a physical layer of a transmitting side and a physical layer of a receiving side via physical channels. The physical channels use time and frequency as radio resources. In detail, the physical channel is modulated using an orthogonal frequency division multiple access (OFDMA) scheme in downlink and is modulated using a single carrier frequency division multiple access (SC-FDMA) scheme in uplink.

The MAC layer of a second layer provides a service to a radio link control (RLC) layer of a higher layer via a logical channel. The RLC layer of the second layer supports reliable data transmission. A function of the RLC layer may be implemented by a functional block of the MAC layer. A packet data convergence protocol (PDCP) layer of the second layer performs a header compression function to reduce unnecessary control information for efficient transmission of an Internet protocol (IP) packet such as an IP version 4 (IPv4) packet or an IP version 6 (IPv6) packet in a radio interface having a relatively small bandwidth.

A radio resource control (RRC) layer located at the bottom of a third layer is defined only in the control plane. The RRC layer controls logical channels, transport channels, and physical channels in relation to configuration, re-configuration, and release of radio bearers (RBs). An RB refers to a service that the second layer provides for data transmission between the UE and the E-UTRAN. To this end, the RRC layer of the UE and the RRC layer of the E-UTRAN exchange RRC messages with each other.

One cell of the eNB is set to operate in one of bandwidths such as 1.25, 2.5, 5, 10, 15, and 20 MHz and provides a downlink or uplink transmission service to a plurality of UEs in the bandwidth. Different cells may be set to provide different bandwidths.

Downlink transport channels for transmission of data from the E-UTRAN to the UE include a broadcast channel (BCH) for transmission of system information, a paging channel (PCH) for transmission of paging messages, and a downlink shared channel (SCH) for transmission of user traffic or control messages. Traffic or control messages of a downlink multicast or broadcast service may be transmitted through the downlink SCH and may also be transmitted through a separate downlink multicast channel (MCH).

Uplink transport channels for transmission of data from the UE to the E-UTRAN include a random access channel (RACH) for transmission of initial control messages and an uplink SCH for transmission of user traffic or control messages. Logical channels that are defined above the transport channels and mapped to the transport channels include a broadcast control channel (BCCH), a paging control channel (PCCH), a common control channel (CCCH), a multicast control channel (MCCH), and a multicast traffic channel (MTCH).

FIG. 5 is a view showing an example of a physical channel structure used in an E-UMTS system.

A physical channel includes several subframes on a time axis and several subcarriers on a frequency axis. Here, one subframe includes a plurality of symbols on the time axis. One subframe includes a plurality of resource blocks and one resource block includes a plurality of symbols and a plurality of subcarriers. In addition, each subframe may use certain subcarriers of certain symbols (e.g., a first symbol) of a subframe for a physical downlink control channel (PDCCH), that is, an L1/L2 control channel. In FIG. 5, an L1/L2 control information transmission area (PDCCH) and a data area (PDSCH) are shown. In one embodiment, a radio frame of 10 ms is used and one radio frame includes 10 subframes. In addition, one subframe includes two consecutive slots. The length of one slot may be 0.5 ms. In addition, one subframe includes a plurality of OFDM symbols and a portion (e.g., a first symbol) of the plurality of OFDM symbols may be used for transmitting the L1/L2 control information. A transmission time interval (TTI) which is a unit time for transmitting data is 1 ms.

A base station and a UE mostly transmit/receive data via a PDSCH, which is a physical channel, using a DL-SCH which is a transmission channel, except a certain control signal or certain service data. Information indicating to which UE (one or a plurality of UEs) PDSCH data is transmitted and how the UE receive and decode PDSCH data is transmitted in a state of being included in the PDCCH.

For example, in one embodiment, a certain PDCCH is CRC-masked with a radio network temporary identity (RNTI) "A" and information about data is transmitted using a radio resource "B" (e.g., a frequency location) and transmission format information "C" (e.g., a transmission block size, modulation, coding information or the like) via a certain subframe. Then, one or more UEs located in a cell monitor the PDCCH using its RNTI information. And, a specific UE with RNTI "A" reads the PDCCH and then receive the PDSCH indicated by B and C in the PDCCH information.

Figure 6:
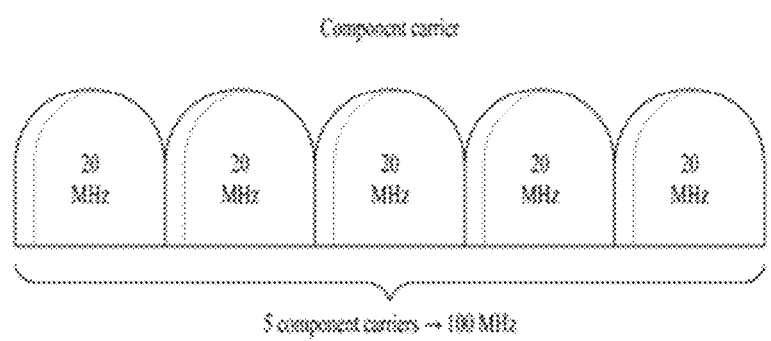
FIG. 6 is a diagram for carrier aggregation.

FIG. 6 is a diagram for carrier aggregation.

Carrier aggregation technology for supporting wide bandwidth. As mentioned in the foregoing description, it may be able to support system bandwidth up to maximum 100 MHz in a manner of bundling maximum 5 carriers (component carriers: CCs) of bandwidth unit (e.g., 20 MHz) defined in a legacy wireless communication system (e.g., LTE system) by carrier aggregation. Component carriers used for carrier aggregation may be equal to or different from each other in bandwidth size. And, each of the component carriers may have a different frequency band (or center frequency). The component carriers may exist on contiguous frequency bands. Yet, component carriers existing on non-contiguous frequency bands may be used for carrier aggregation as well. In the carrier aggregation technology, bandwidth sizes of uplink and downlink may be allocated symmetrically or asymmetrically.

Multiple carriers (component carriers) used for carrier aggregation may be categorized into primary component carrier (PCC) and secondary component carrier (SCC). The PCC may be called P-cell (primary cell) and the SCC may be called S-cell (secondary cell). The primary component carrier is the carrier used by a base station to exchange traffic and control signaling with a user equipment. In this case, the control signaling may include addition of component carrier, setting for primary component carrier, uplink (UL) grant, downlink (DL) assignment and the like. Although a base station may be able to use a plurality of component carriers, a user equipment belonging to the corresponding base station may be set to have one primary component carrier only. If a user equipment operates in a single carrier mode, the primary component carrier is used. Hence, in order to be independently used, the primary component carrier should be set to meet all requirements for the data and control signaling exchange between a base station and a user equipment.

Meanwhile, the secondary component carrier may include an additional component carrier that can be activated or deactivated in accordance with a required size of transceived data. The secondary component carrier may be set to be used only in accordance with a specific command and rule received from a base station. In order to support an additional bandwidth, the secondary component carrier may be set to be used together with the primary component carrier. Through an activated component carrier, such a control signal as a UL grant, a DL assignment and the like can be received by a user equipment from a base station. Through an activated component carrier, such a control signal in UL as a channel quality indicator (CQI), a precoding matrix index (PMI), a rank indicator (RI), a sounding reference signal (SRS) and the like can be transmitted to a base station from a user equipment.

Resource allocation to a user equipment can have a range of a primary component carrier and a plurality of secondary component carriers. In a multi-carrier aggregation mode, based on a system load (i.e., static/dynamic load balancing), a peak data rate or a service quality requirement, a system may be able to allocate secondary component carriers to DL and/or UL asymmetrically. In using the carrier aggregation technology, the setting of the component carriers may be provided to a user equipment by a base station after RRC connection procedure. In this case, the RRC connection may mean that a radio resource is allocated to a user equipment based on RRC signaling exchanged between an RRC layer of the user equipment and a network via SRB. After completion of the RRC connection procedure between the user equipment and the base station, the user equipment may be provided by the base station with the setting information on the primary component carrier and the secondary component carrier. The setting information on the secondary component carrier may include addition/deletion (or activation/deactivation) of the secondary component carrier. Therefore, in order to activate a secondary component carrier between a base station and a user equipment or deactivate a previous secondary component carrier, it may be necessary to perform an exchange of RRC signaling and MAC control element.

The activation or deactivation of the secondary component carrier may be determined by a base station based on a quality of service (QoS), a load condition of carrier and other factors. And, the base station may be able to instruct a user equipment of secondary component carrier setting using a control message including such information as an indication type (activation/deactivation) for DL/UL, a secondary component carrier list and the like.

As stated above, present invention is for random access procedure for dual connectivity environment. Exemplary random access procedure is explained in detail.

Figure 7:
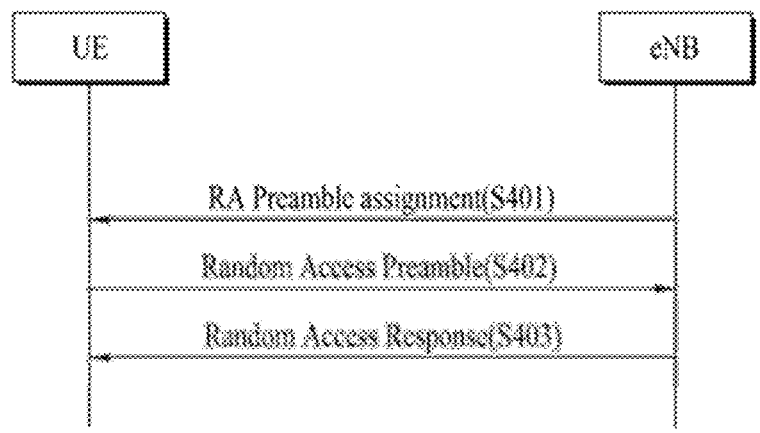
FIG. 7 is a diagram illustrating an operation procedure of a user equipment and a base station during a non-contention based random access procedure.

FIG. 7 is a diagram illustrating an operation procedure of a user equipment and a base station during a non-contention based random access procedure.

(1) Random Access Preamble Assignment

The non-contention based random access procedure can be performed for two cases, i.e., (1) when a handover procedure is performed, and (2) when requested by a command of the base station. Of course, the contention based random access procedure may also be performed for the two cases.

First of all, for non-contention based random access procedure, it is important that the user equipment receives a designated random access preamble having no possibility of contention from the base station. Examples of a method of receiving a random access preamble include a method through a handover command and a method through a PDCCH command. A random access preamble is assigned to the user equipment through the method of receiving a random access preamble (S401).

(2) First Message Transmission

As described above, after receiving a random access preamble designated only for the user equipment, the user equipment transmits the preamble to the base station (S402).

(3) Second Message Reception

After the user equipment transmits the random access preamble in step S402, the base station tries to receive its random access response within a random access response receiving window indicated through system information or handover command (S403). In more detail, the random access response can be transmitted in the form of a MAC protocol data unit (MAC PDU), and the MAC PDU can be transferred through a physical downlink shared channel (PDSCH). Also, it is preferable that the user equipment monitors a physical downlink control channel (PDCCH) to appropriately receive information transferred to the PDSCH. Namely, it is preferable that the PDCCH includes information of a user equipment which should receive the PDSCH, frequency and time information of radio resources of the PDSCH, and a transport format of the PDSCH. If the user equipment successfully receives the PDCCH transmitted thereto, the user equipment can appropriately receive a random access response transmitted to the PDSCH in accordance with the information of the PDCCH. The random access response can include a random access preamble identifier (ID) (for example, random access preamble identifier (RA-RNTI)), uplink grant indicating uplink radio resources, a temporary C-RNTI, and timing advance command (TAC) values.

As described above, the random access preamble identifier is required for the random access response to indicate whether the uplink grant, the temporary C-RNTI and the TAC values are effective for what user equipment as random access response information for one or more user equipments can be included in one random access response. In this case, it is assumed that the user equipment selects a random access preamble identifier corresponding to the random access preamble selected in step S402.

In the non-contention based random access procedure, the user equipment can terminate the random access procedure after determining that the random access procedure has been normally performed by receiving the random access response information.

Figure 8:
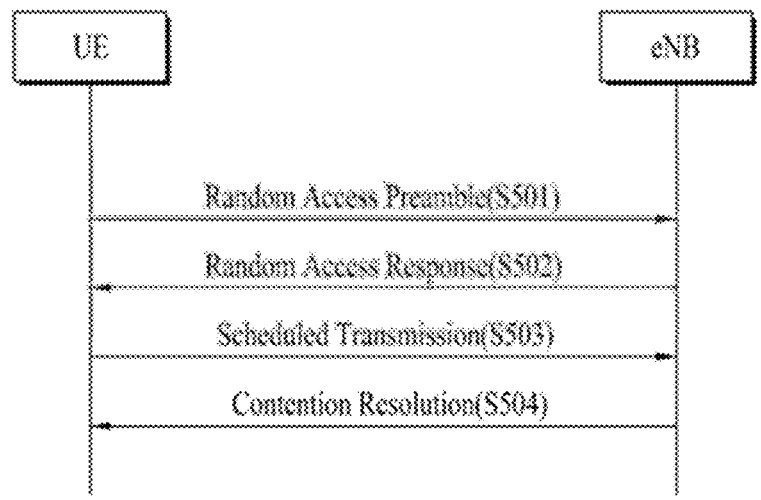
FIG. 8 is a diagram illustrating an operation procedure of a user equipment and a base station during a contention based random access procedure.

FIG. 8 is a diagram illustrating an operation procedure of a user equipment and a base station during a contention based random access procedure.

(1) First Message Transmission

First of all, the user equipment randomly selects one random access preamble from a set of random access preambles indicated through system information or handover command, and selects a physical RACH (PRACH) resource that can transmit the random access preamble (S501).

(2) Second Message Reception

A method of receiving random access response information is similar to that of the aforementioned non-contention based random access procedure. Namely, after the user equipment transmits the random access preamble in step S402, the base station tries to receive its random access response within a random access response receiving window indicated through system information or handover command, and receives the PDSCH through corresponding random access identifier information (S502). In this case, the base station can receive uplink grant, a temporary C-RNTI, and timing advance command (TAC) values.

(3) Third Message Transmission

If the user equipment receives its effective random access response, the user equipment respective processes information included in the random access response. Namely, the user equipment applies TAC and store a temporary C-RNTI. Also, the user equipment transmits data (i.e., third message) to the base station using UL grant (S503). The third message should include a user equipment identifier. This is because that the base station needs to identify user equipments which perform the contention based random access procedure, thereby avoiding contention later.

Two methods have been discussed to include the user equipment identifier in the third message. In the first method, if the user equipment has an effective cell identifier previously assigned from a corresponding cell before the random access procedure, the user equipment transmits its cell identifier through an uplink transport signal corresponding to the UL grant. On the other hand, if the user equipment does not have an effective cell identifier previously assigned from a corresponding cell before the random access procedure, the user equipment transmits its cell identifier including its unique identifier (for example, S-TMSI or random ID). Generally, the unique identifier is longer than the cell identifier. If the user equipment transmits data corresponding to the UL grant, the user equipment starts a contention resolution timer.

(4) Fourth Message Reception

After transmitting data including its identifier through UL grant included in the random access response, the user equipment waits for a command of the base station for contention resolution. Namely, the user equipment tries to receive the PDCCH to receive a specific message (504). Two methods have been discussed to receive the PDCCH. As described above, if the third message is transmitted to correspond to the UL grant using the user equipment identifier, the user equipment tries to receive the PDCCH using its cell identifier. If the user equipment identifier is a unique identifier of the user equipment, the user equipment tries to receive the PDCCH using a temporary cell identifier included in the random access response. Afterwards, in case of the first method, if the user equipment receives the PDCCH through its cell identifier before the contention resolution timer expires, the user equipment determines that the random access procedure has been performed normally, and ends the random access procedure. In case of the second method, if the user equipment receives the PDCCH through the temporary cell identifier before the contention resolution timer expires, the user equipment identifies data transferred from the PDSCH. If the unique identifier of the user equipment is included in the data, the user equipment determines that the random access procedure has been performed normally, and ends the random access procedure.

In LTE Rel-12, a new study on Small Cell Enhancement is started, where the dual connectivity is supported. That is, UE is connected to both Macro cell and Small cell, as shown in FIG. 9.

Figure 9:
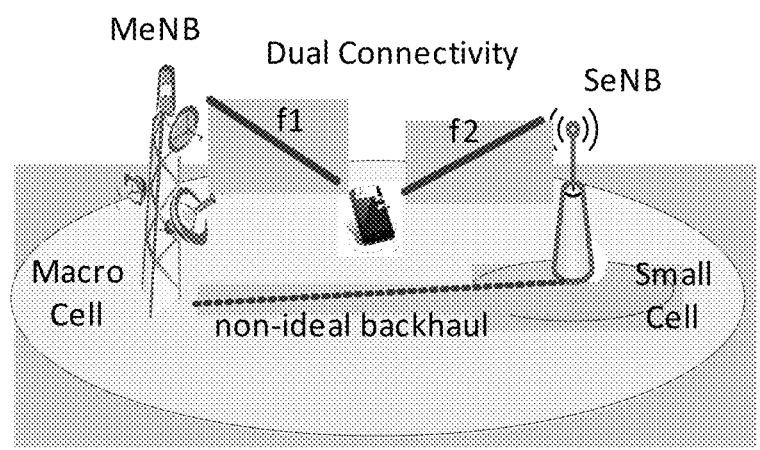
FIG. 9 is a diagram for explaining dual connectivity of the UE according to one aspect of the present invention.

FIG. 9 is a diagram for explaining dual connectivity of the UE according to one aspect of the present invention.

In FIG. 9, the MeNB stands for Macro cell eNB, and SeNB for Small cell eNB. Small cell may comprise femto cell, pico cell, etc.

The interface between MeNB and SeNB is called Xn interface. The Xn interface is assumed to be non-ideal; i.e. the delay in Xn interface could be up to 60 ms.

The SeNB is responsible for transmitting best effort (BE) type traffic, while the MeNB is responsible for transmitting other types of traffic such as VoIP, streaming data, or signaling data. Here, BE type traffic may be delay tolerable and error intolerable traffic.

Figure 10:
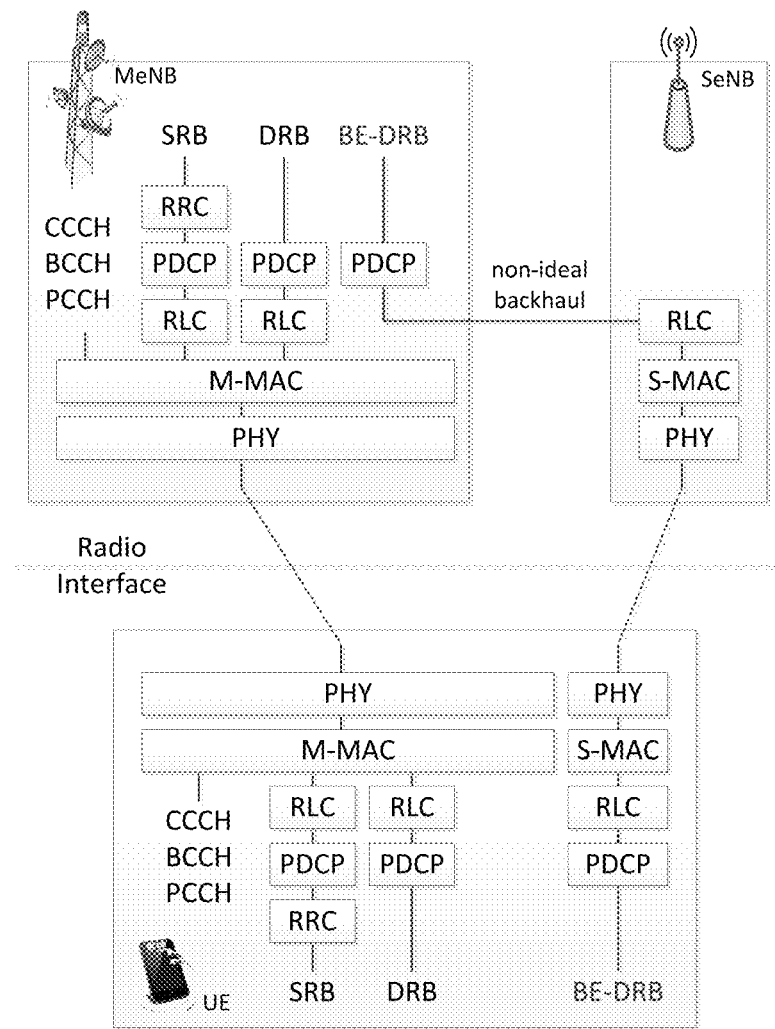
FIG. 10 is a diagram showing an exemplary architecture for supporting dual connectivity.

To support dual connectivity, various protocol architectures are studied, and one of potential architectures according to one aspect of the present invention is shown in FIG. 10.

FIG. 10 is a diagram showing an exemplary architecture for supporting dual connectivity.

In FIG. 10, MeNB has various radio bearers, signaling radio bearer (SRB), data radio bearer (DRB) and best effort DRB (BE-DRB). In view of BE-DRB, PDCP and RLC entities are located in different network nodes, i.e. PDCP in MeNB and RLC in SeNB.

In the UE side, the protocol architecture is same as prior art except the MAC entity is setup for each eNB (i.e. M-MAC for MeNB and S-MAC for SeNB). This is because the scheduling nodes are located in different nodes and two nodes are linked with non-ideal backhaul.

There are two MAC entities in the UE, i.e., M-MAC and S-MAC: The M-MAC is responsible for transmission between the UE and the MeNB, and the S-MAC is in charge of transmission between the UE and the SeNB. In the description below, M-MAC refers to the M-MAC in the UE and S-MAC refers to the S-MAC in the UE, except the cases when defined otherwise. The M-MAC in the MeNB and S-MAC in the SeNB will be explicitly specified.

In this dual connectivity situation, since the UE is connected to both of Macro cell (MeNB) and Small cell (SeNB), the UE needs to perform the random access (RA) procedure in parallel on the Macro cell and the Small cell. This may cause a overlapping RA procedures in M-MAC and S-MAC.

In the conventional art, there is only one RA procedure ongoing at any point in time based on the UE implementation. However, in Small cell environment, it is preferable to make the Macro cell be prioritized over the Small cell, because the Small cell is used for a best-effort manner Thus, in one aspect of the present invention, it is proposed for the UE to be able to prioritize the RA procedure on the Macro cell over the RA procedure on the Small cell during RA procedures.

Figure 11:
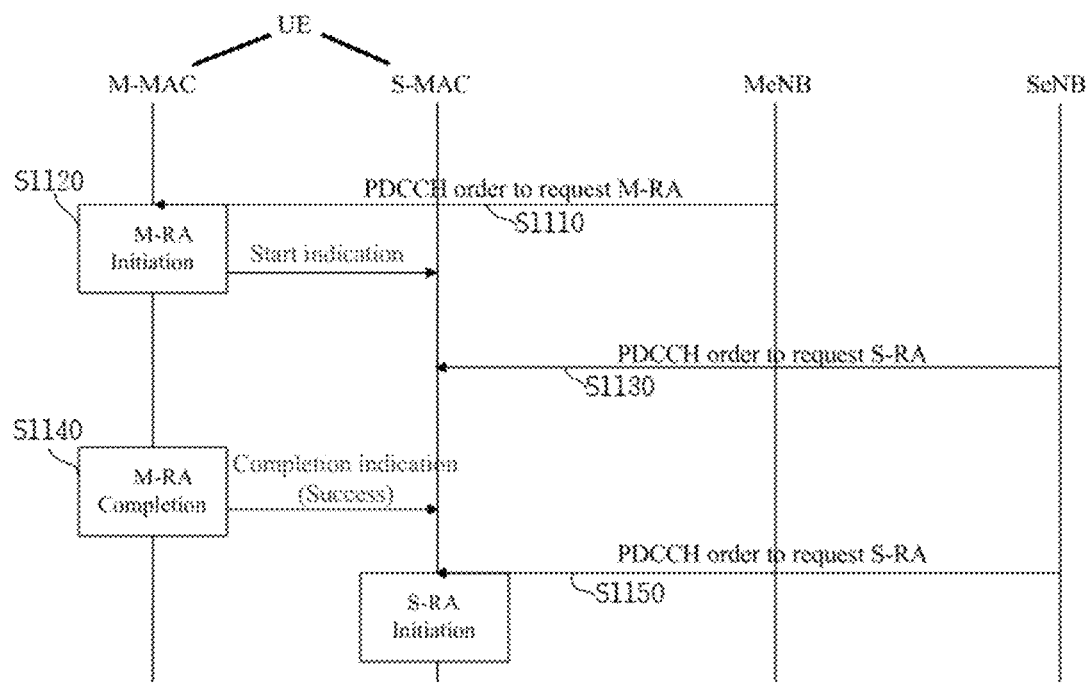
FIG. 11 is a diagram for explanation on a preferred embodiment of the present invention.

FIG. 11 is a diagram for explanation on a preferred embodiment of the present invention.

As shown in FIG. 11, there are two MAC entities in the UE, i.e., M-MAC and S-MAC. The M-MAC is responsible for transmission between the UE and the MeNB, and the S-MAC is in responsible for transmission between the UE and the SeNB. Accordingly, the M-MAC in the UE performs the RA procedure on the MeNB and the S-MAC in the UE performs the RA procedure on the SeNB. In the description below, the M-RA refers to the RA procedure on the Macro cell and the S-RA refers to the RA procedure on the Small cell. In the description below, it is assumed that the M-MAC performs the M-RA and the S-MAC performs the S-RA.

Also, although it is not shown in FIG. 11, there are two PHY entities in the UE, i.e., M-PHY and S-PHY. The M-PHY is linked to the M-MAC and the S-PHY is linked to the S-MAC. In the description below, M-PHY refers to the M-PHY in the UE and S-PHY refers to the S-PHY in the UE.

In this embodiment, it is proposed that, if there are two MAC entities in the UE (M-MAC and S-MAC), when the M-MAC starts the M-RA, the M-MAC sends an indication of start/completion of M-RA to the S-MAC. When the S-MAC receives the indication of start of M-RA from the M-MAC, the S-MAC stops/ignores the initiation of S-RA. When the S-MAC receives the indication of completion of M-RA from the M-MAC, the S-MAC starts the contention based S-RA if there is any stopped/ignored S-RA.

In the example of FIG. 11, the M-MAC of the UE may receive PDCCH order requesting M-RA (S1110). But, the M-MAC of UE may initiate the M-RA by itself.

If the M-MAC is requested an M-RA by a PDCCH order from MeNB or the M-MAC itself, the M-MAC may starts with the M-RA (S1120). When the M-MAC starts with the M-RA, it is proposed that the M-MAC sends an indication to the S-MAC indicating that the M-MAC starts with the M-RA, which is called a 'start indication'.

In addition, when the M-MAC completes the M-RA, it is proposed that the M-MAC sends an indication of completion of M-RA to the S-MAC, which is called a 'completion indication' (S1140). The M-MAC may send the 'completion indication' to the S-MAC regardless of whether the M-RA is successfully completed or unsuccessfully completed.

When the S-MAC receives the start indication from the M-MAC, and if there is an on-going S-RA, the S-MAC may stop the on-going S-RA. The S-MAC may discard explicitly signaled preamble for S-RA and ra-PRACH-MaskIndex, if any. Also, the S-MAC may flush the HARQ buffer used for transmission of the MAC PDU in the Msg3 buffer.

If the S-MAC is requested an S-RA by the PDCCH order from SeNB (S1130) or by the S-MAC itself after receiving the start indication from the M-MAC, the S-MAC may ignore the request of the S-RA initiation.

The S-MAC may ignore the request of the S-RA initiation during the time duration between receiving the starting indication of the M-RA from the M-MAC and receiving the completion indication of the S-RA from the M-MAC.

When the S-MAC receives the completion indication from the M-MAC, the S-MAC starts the S-RA as a contention based random access in the following cases.

If there is any stopped S-RA in the S-MAC; or
If there is any ignored S-RA in the S-MAC.

In FIG. 11, after receiving completion indication from M-MAC, when S-MAC receives PDCCH order from SeNB requesting S-RA, the S-MAC initiates S-RA (S1150), since it is after receiving the indication indicating the completion indication from the M-MAC.

Figure 12:
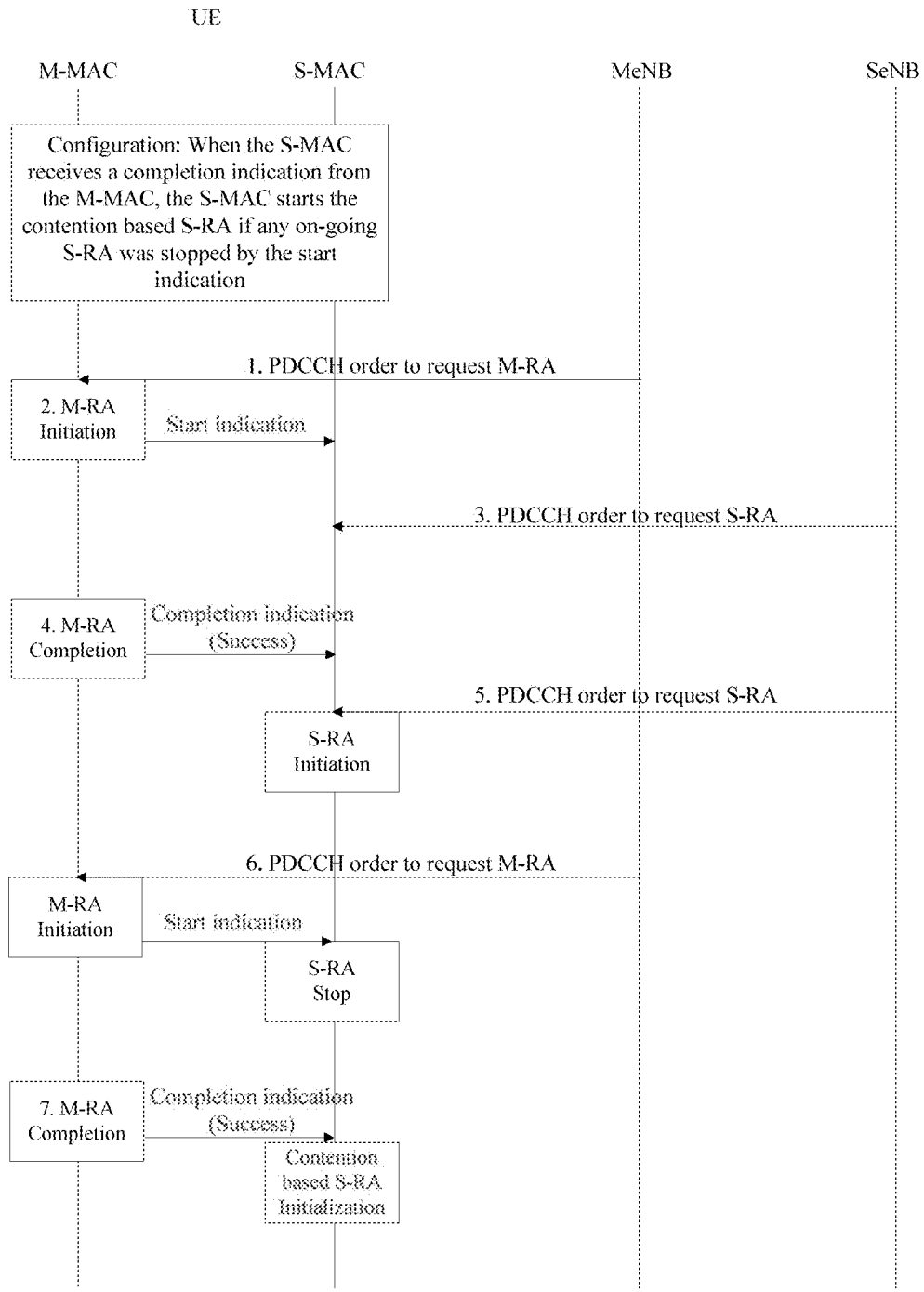
FIG. 12 is a diagram of another example of the present invention.

FIG. 12 is a diagram of another example of the present invention.

In FIG. 12, there are two MAC entities in a UE: M-MAC and S-MAC as like FIG. 11. The UE is configured by the network that when the S-MAC receives a completion indication from the M-MAC, the S-MAC starts the contention based S-RA if the S-MAC stopped any on-going S-RA upon reception of start indication from the M-MAC.

The MeNB may send a PDCCH order to the UE to request an M-RA (Step 1). When the M-MAC receives the PDCCH order from the MeNB to initialize the M-RA, the M-MAC may start with the M-RA and the M-MAC may send a start indication to the S-MAC (Step 2). The SeNB may send a PDCCH order to the UE to request an S-RA (Step 3). Since the S-MAC had received a start indication from the M-MAC but did not receive a completion indication from the M-MAC yet, the S-MAC may ignore the S-RA request from the SeNB.

When the M-MAC completes the M-RA, the M-MAC may send a completion indication to the S-MAC (Step 4). Since there is no stopped S-RA, the S-MAC does not start the contention based S-RA.

The SeNB may send a PDCCH order to the UE to request an S-RA again (Step 5). Since the S-MAC received a completion indication from the M-MAC, the S-MAC may initialize the S-RA.

The MeNB may send a PDCCH order to the UE to request an M-RA again (Step 6). Then, the M-MAC starts with the M-RA and the M-MAC sends a start indication to the S-MAC. When the S-MAC receives a start indication, the S-MAC stops the on-going S-RA.

When the M-MAC completes the M-RA, the M-MAC may send a completion indication to the S-MAC (Step 7). When the S-MAC receives the completion indication from the M-MAC, the S-MAC starts the contention based S-RA because the S-MAC stopped the on-going S-RA in step 6

Explanation below is for another aspect of the present invention for procedures between PHY entity and the MAC entity of the UE.

When the M-RA/S-RA is requested by the PDCCH order from the MeNB/SeNB or by the M-MAC/S-MAC itself, the M-MAC/S-MAC may start with the M-RA/S-RA, respectively. In dual connectivity environment, there can be a situation when S-PHY cannot transmit random access preamble due to the coexistence of the M-RA. It may be because of the lack of transmission power, etc. In the conventional art, this failure of transmission of random access preamble is not separately defined. Thus, it has to be managed by the random access failure. But, this may cause unwanted delay of the random access procedure.

So, in one aspect of the present invention, if there are two MAC entities in the UE (M-MAC and S-MAC), when the S-PHY is not able to transmit the preamble for S-RA to the SeNB as instructed by the S-MAC, the S-PHY does not transmit the preamble for S-RA to the SeNB. In addition, the S-PHY indicates to the S-MAC that the preamble transmission for S-RA is not performed. When the S-MAC receives the indication from the S-PHY, the S-MAC continues the S-RA or stops the S-RA. When the S-MAC continues the S-RA upon receiving the indication, the S-MAC does not increase the PREAMBLE_TRANSMISSION_COUNTER or delays the preamble transmission by the backoff. This scheme is explained in more detail with exemplary figures.

Figure 13:
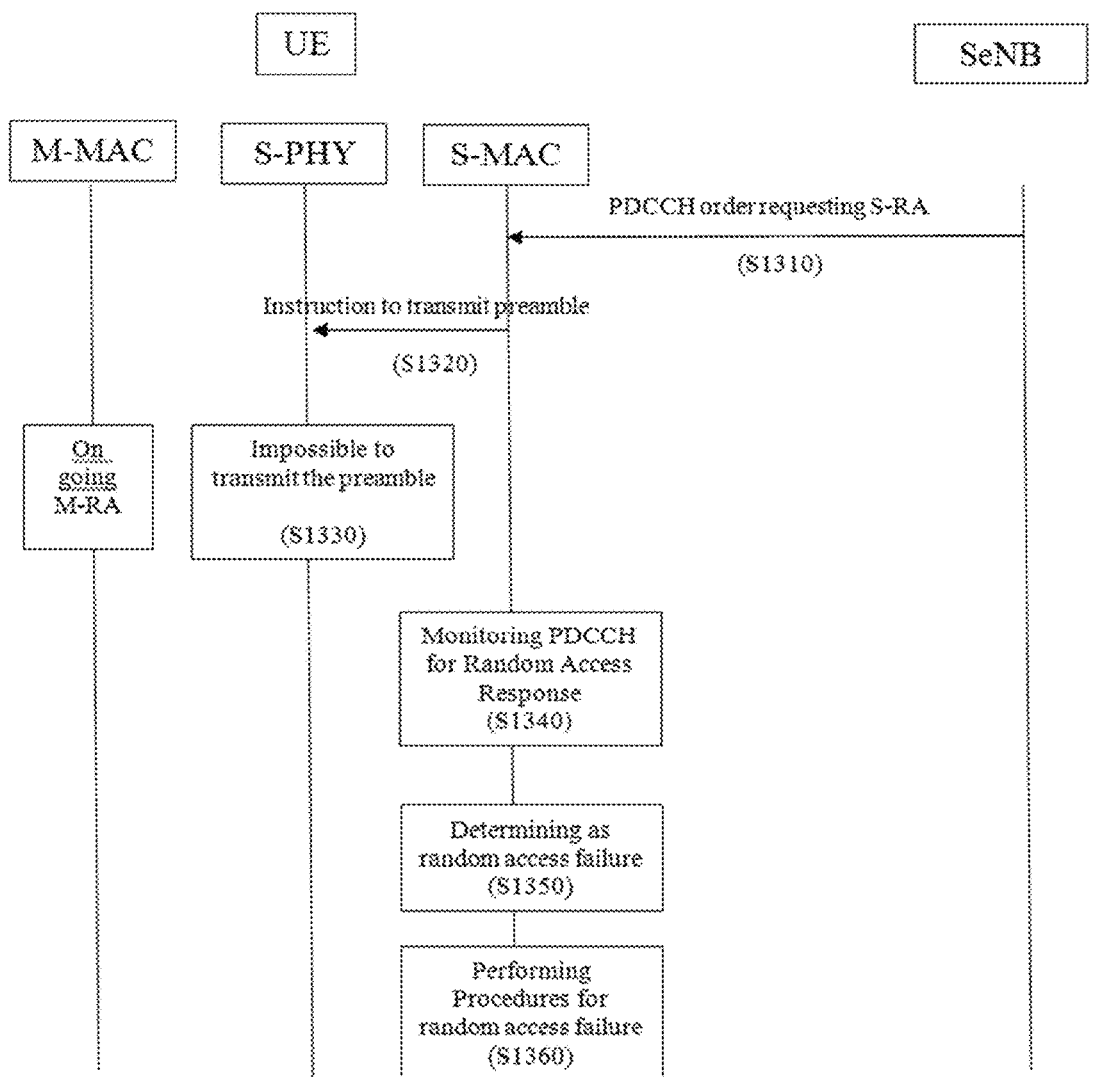
FIG. 13 is a diagram for explaining the procedure according to current LTE standard considering dual connectivity.

FIG. 13 is a diagram for explaining the procedure according to current LTE standard considering dual connectivity.

S-MAC of the UE may receive PDCCH order requesting S-RA (S1310). Of course, the S-MAC may initiate S-RA by itself. In this figure, the PDCCH order is shown as received by S-MAC directly, but actual operation is that the PDCCH order is received by S-PHY and delivered to S-MAC.

If the S-MAC initiated S-RA, the S-MAC may instruct S-PHY to transmit preamble to SeNB (S1320). Here, the transmission power of the preamble transmission is set as 'preambleInitialReceivedTargetPower+DELTA_PREAMBLE+(PREAMBLE_TRANSMISSION_COUNTER−1)*powerRampingStep' as explaiend above. Also, S-MAC may instruct the S-PHY to transmit a preamble using the selected PRACH, corresponding RA-RNTI, preamble index and PREAMBLE_RECEIVED_TARGET_POWER.

As explained above, there can be a situation when S-PHY cannot transmit the preamble due to the coexistence of the on-going M-RA. It may be because of the transmission power limit, but it is not necessarily limited to this situation. In the current technical standard, there is no procedure for treating this problem. So, it shall be treated as conventional random access failure procedure.

That is, the S-MAC of UE may monitor the PDCCH from SeNB in order to receive random access response (S1340). This monitoring shall be performed during the random access monitoring window having a length of ra-ResponseWindowSize subframes.

If the S-MAC fails to receive random access response for its preamble transmission, it determined that the random access procedure is not successful (S1350). Specifically, if no Random Access Response is received within the RA Response window, or if none of all received Random Access Responses contains a Random Access Preamble identifier corresponding to the transmitted Random Access Preamble, the Random Access Response reception is considered not successful and S-MAC may perform procedures for random access failure (S1360). Procedures for random access failure includes the following:

The S-MAC increments PREAMBLE_TRANSMISSION_COUNTER by 1.

If PREAMBLE_TRANSMISSION_COUNTER= preambleTransMax+1, that is, if the PREAMBLE_TRANSMISSION_COUNTER reaches to the maximum alloable number, it indicate a Random Access problem to upper layers (if the Random Access Preamble is transmitted on the PCell, or consider the Random Access procedure unsuccessfully completed (if the Random Access Preamble is transmitted on an SCell).

If in this Random Access procedure, the Random Access Preamble was selected by MAC: based on the backoff parameter in the UE, select a random backoff time according to a uniform distribution between 0 and the Backoff Parameter Value; delay the subsequent Random Access transmission by the backoff time; and proceed to the selection of a Random Access Resource from the first.

Those skilled in the art would realize that the above procedure is inefficient, so the following schemes are proposed.

Figure 14:
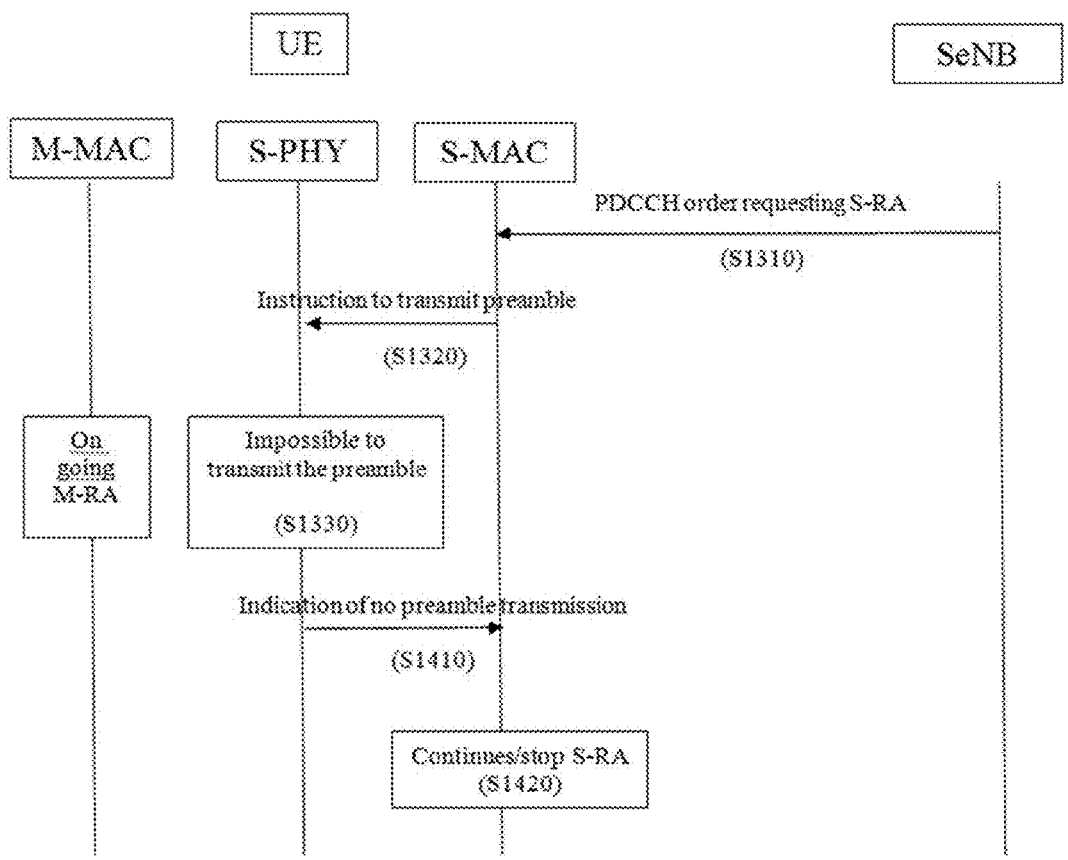
FIG. 14 is a diagram for explaining one example of the present invention.

FIG. 14 is a diagram for explaining one example of the present invention.

If the M-MAC is requested an M-RA by a PDCCH order or the M-MAC itself, the M-MAC starts with the M-RA. If the S-MAC is requested an S-RA by a PDCCH order or the S-MAC itself, the S-MAC starts with the S-RA (S1310).

When the M-MAC starts with the M-RA, the M-MAC instructs the M-PHY to transmit the preamble for M-RA using the selected PRACH and the PREAMBLE_RECEIVED_TARGET_POWER. When the S-MAC starts with the S-RA, the S-MAC instructs the S-PHY to transmit the preamble for S-RA using the selected PRACH and the PREAMBLE_RECEIVED_TARGET_POWER (S1320).

When S-PHY receives the instruction from the S-MAC to transmit the preamble for S-RA, if the S-PHY is not able to transmit the preamble for S-RA to the SeNB using the PRACH, or the PREAMBLE_RECEIVED_TARGET_POWER as instructed from the S-MAC, the S-PHY does not transmit the preamble for S-RA to the SeNB (S1330). This may be cause by on-going M-RA as shown in FIG. 14.

When the S-PHY does not transmit the preamble for S-RA to the SeNB, it is proposed that the S-PHY sends an indication to the S-MAC which indicates that S-PHY is not able to transmit the preamble for S-RA to the SeNB (S1410).

When the S-MAC receives this indication from S-PHY, the S-MAC may continue or stop S-RA without performing procedures for the random access failure (S1420). That is, S-MAC does not have to perform the procedures for the random access failure as explained with regards to FIG. 13. If the S-MAC determines to continue the S-RA, S-MAC may reselect the random access resource and instruct again to S-PHY to transmit the preamble after predetermined backoff time. If the S-MAC determines to stop the S-RA, S-MAC may discard the random access resource and flush the HARQ buffer for random access procedure.

Figure 15:
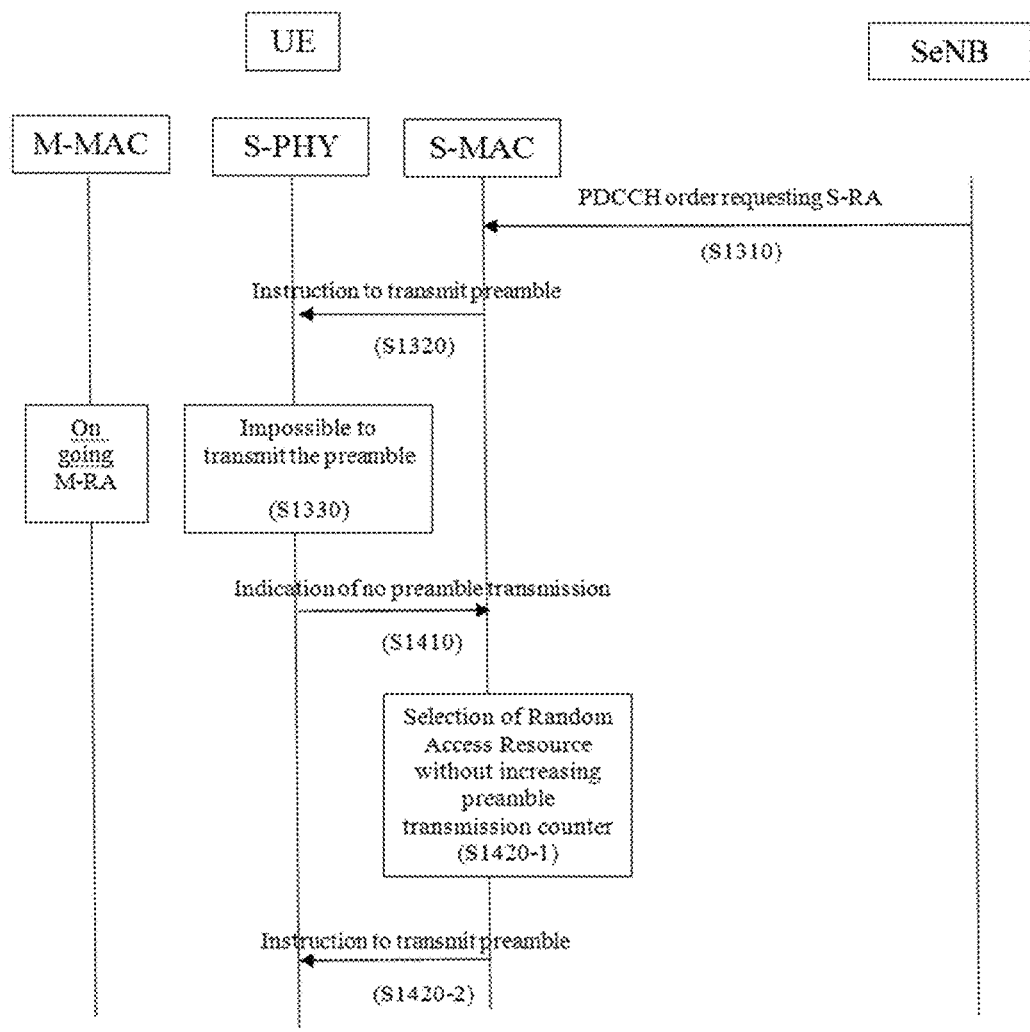
FIGS. 15 and 16 are detailed examples for the scheme explained with regards to FIG. 14.
Figure 16:
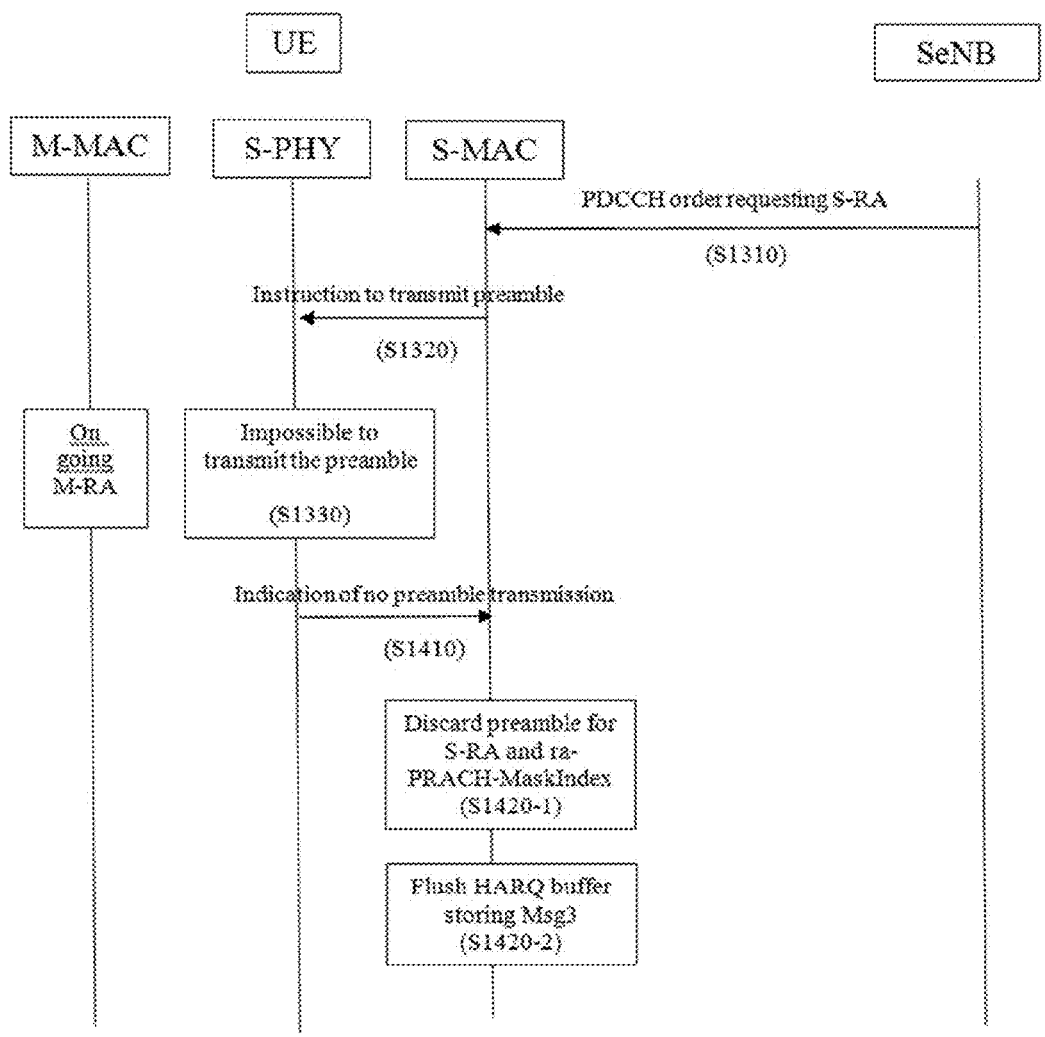

FIGS. 15 and 16 are detailed examples for the scheme explained with regards to FIG. 14.

Procedures before S1410 are the same as FIG. 14 both for FIGS. 15 and 16. FIG. 15 is for procedures when S-MAC determines to continue S-RA. FIG. 16 is for procedures when S-MAC determines to stop S-RA.

Referring to FIG. 15, when the S-MAC receives indication from S-PHY indicating that the preamble transmission is impossible, the S-MAC may determine to continue S-RA. Specifically, the S-MAC may proceed to the selection of a Random Access Resource without increasing the PREAMBLE_TRANSMISSION_COUNTER (S1420-1). In this case, as the PREAMBLE_TRANSMISSION_COUNTER is not increased, the PREAMBLE_RECEIVED_TARGET_POWER is not increased.

The S-MAC may proceed to the selection of a Random Access Resource by setting the backoff parameter value in the UE. The backoff parameter value can be pre-defined between the UE and the network or configured by the network using an RRC/MAC/PHY signal. Based on the backoff parameter value in the UE, the S-MAC may select a random backoff time according to a uniform distribution between 0 and the backoff parameter value. The S-MAC delays the subsequent Random Access transmission by the backoff time, and then proceeds to the selection of a Random Access Resource.

Then, the S-MAC may instruct S-PHY to transmit preamble (S1420-2).

Referring to FIG. 16, when S-MAC receives indication from S-PHY indicating that the preamble transmission is impossible, the S-MAC may determine to stop S-RA. Specifically, the S-MAC may discard explicitly signaled preamble for S-RA and ra-PRACH-MaskIndex, if any (S1420-1). Further, the S-MAC may flush the HARQ buffer used for transmission of the MAC PDU in the Msg3 buffer (S1420-2). By these actions, the S-MAC may stop the on-going S-RA.

If the S-MAC receives the completion indication indicating that the M-MAC completes the M-RA, if the S-MAC stopped the S-RA upon receiving an indication from the S-PHY indicating that the S-PHY is not able to transmit the preamble for S-RA, the S-MAC may start the contention based S-RA.

In this case, the S-MAC may start the contention based S-RA regardless of whether the S-MAC stopped the S-RA which is initiated by the PDCCH order from the SeNB or by the S-MAC itself.

Figure 17:
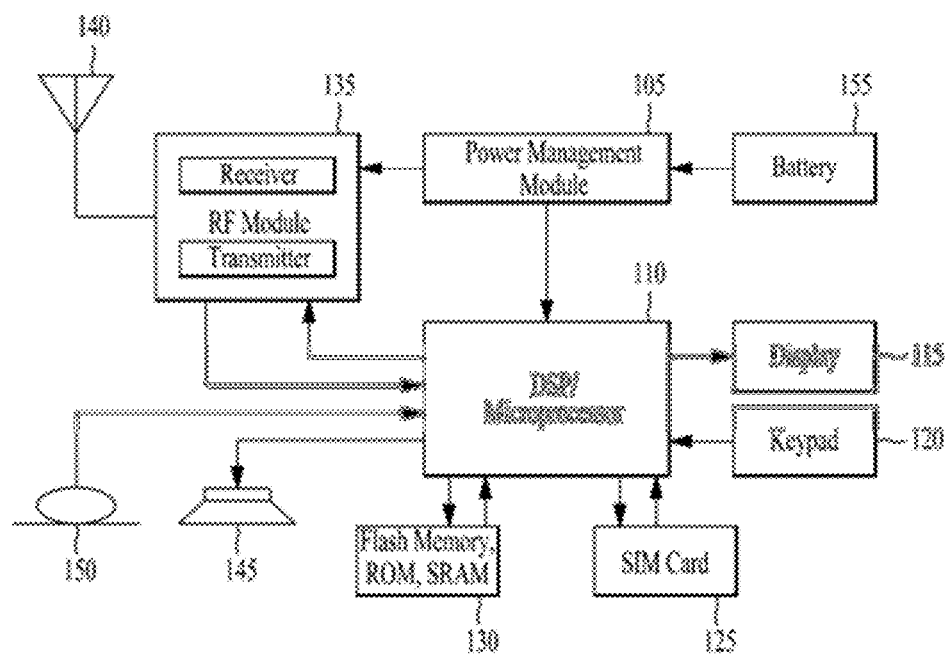
FIG. 17 is a block diagram of a communication apparatus according to an embodiment of the present invention.

FIG. 17 is a block diagram of a communication apparatus according to an embodiment of the present invention.

The apparatus shown in FIG. 17 can be a user equipment (UE) and/or eNB adapted to perform the above mechanism, but it can be any apparatus for performing the same operation.

As shown in FIG. 17, the apparatus may comprises a DSP/microprocessor (110) and RF module (transmiceiver; 135). The DSP/microprocessor (110) is electrically connected with the transciver (135) and controls it. The apparatus may further include power management module (105), battery (155), display (115), keypad (120), SIM card (125), memory device (130), speaker (145) and input device (150), based on its implementation and designer's choice.

Specifically, FIG. 17 may represent a UE comprising a receiver (135) configured to receive signal from SeNB/MeNB, and a transmitter (135) configured to transmit signals to the network. These receiver and the transmitter can constitute the transceiver (135). The UE further comprises a processor (110) connected to the transceiver (135: receiver and transmitter).

Also, FIG. 17 may represent a network apparatus comprising a transmitter (135) configured to transmit signals to a UE and a receiver (135) configured to receive signal from the UE. These transmitter and receiver may constitute the transceiver (135). The network further comprises a processor (110) connected to the transmitter and the receiver.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

The embodiments of the present invention described herein below are combinations of elements and features of the present invention. The elements or features may be considered selective unless otherwise mentioned. Each element or feature may be practiced without being combined with other elements or features. Further, an embodiment of the present invention may be constructed by combining parts of the elements and/or features. Operation orders described in embodiments of the present invention may be rearranged. Some constructions of any one embodiment may be included in another embodiment and may be replaced with corresponding constructions of another embodiment. It is obvious to those skilled in the art that claims that are not explicitly cited in each other in the appended claims may be presented in combination as an embodiment of the present invention or included as a new claim by subsequent amendment after the application is filed.

In the embodiments of the present invention, a specific operation described as performed by the BS may be performed by an upper node of the BS. Namely, it is apparent that, in a network comprised of a plurality of network nodes including a BS, various operations performed for communication with an MS may be performed by the BS, or network nodes other than the BS. The term 'eNB' may be replaced with the term 'fixed station', 'Node B', 'Base Station (BS)', 'access point', etc.

The above-described embodiments may be implemented by various means, for example, by hardware, firmware, software, or a combination thereof.

In a hardware configuration, the method according to the embodiments of the present invention may be implemented by one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, microcontrollers, or microprocessors.

In a firmware or software configuration, the method according to the embodiments of the present invention may be implemented in the form of modules, procedures, functions, etc. performing the above-described functions or operations. Software code may be stored in a memory unit and executed by a processor. The memory unit may be located at the interior or exterior of the processor and may transmit and receive data to and from the processor via various known means.

Those skilled in the art will appreciate that the present invention may be carried out in other specific ways than those set forth herein without departing from the spirit and essential characteristics of the present invention. The above embodiments are therefore to be construed in all aspects as illustrative and not restrictive. The scope of the invention should be determined by the appended claims and their legal equivalents, not by the above description, and all changes coming within the meaning and equivalency range of the appended claims are intended to be embraced therein.

INDUSTRIAL APPLICABILITY

While the above-described method has been described centering on an example applied to the 3GPP LTE system, the present invention is applicable to a variety of wireless communication systems, e.g. IEEE system, in addition to the 3GPP LTE system.

The invention claimed is:

1. A method of communicating with a network at a user equipment (UE) in a wireless communication system, the method comprising:
   receiving, by a medium access control entity (MAC) of the UE instructions to transmit a first access preamble to a first base station to start a first random access procedure and a second random access preamble to a second base station to start a second random access procedure;
   dropping, by a Physical layer (PHY) entity of the UE, the transmission of the second random access preamble of the second random access procedure, when the transmission of the first random access preamble overlaps with the transmission of the second random access preamble;
   informing, by the PHY entity to the MAC entity, an indication associated with the dropped second random access preamble; and
   continuing, at the MAC entity of the UE, the second random access procedure for a case of unsuccessful reception of a random access response without incrementing a number of random access preamble transmissions, if the indication has been received from the PHY entity of the UE.

2. The method of claim 1, wherein the indication is different from an indication for a random access procedure failure.

3. The method of claim 1, wherein the second random access procedure for the case of unsuccessful reception of the random access response includes:
   determining whether the number of random access preamble transmissions reaches to a maximum allowable number of transmissions;
   reporting the reach to the maximum allowable number of transmissions to higher layer entity or concluding the random access procedure is unsuccessfully completed, if the number of random access preamble transmissions reaches to the maximum allowable number of transmissions; and
   reselecting a random access resource, if the number of random access preamble transmissions does not reach to the maximum allowable number of transmissions.

4. The method of claim 1, wherein the MAC entity comprises a first MAC entity responsible for transferring data to the first base station and a second MAC entity responsible for transferring data to the second base station, and
   wherein a first service area of the first base station is larger than a second service area of the second base station.

5. A user equipment (UE) communicating with a network in a wireless communication system, the UE comprising:
   a transceiver configured to transmit and receive signals from a first base station and a second base station;
   a processor connected to the transceiver and comprising a physical layer (PHY) entity and a MAC medium access control (MAC) entity;
   wherein the processor is configured to:
   control the PHY entity to receive instructions to transmit a first random access preamble to the first base station to start a first random access procedure and a second random access preamble to the second base station to start a second random access procedure:
   drop the transmission of the second random access preamble of the second random access procedure, when the transmission of the first random access preamble overlaps with the transmission of the second random access preamble;
   inform the MAC entity an indication association with the dropped second random access preamble of the second random access procedure; and
   control the MAC entity to continue a random access procedure for a case of unsuccessful reception of a random access response without incrementing a number of random access preamble transmissions, if the indication has been received from the PHY entity.

6. The UE of claim 5, wherein the processor is further configured to:
   control the MAC entity to reselect a random access resource without increasing the number of random access preamble transmissions; and instruct the PHY entity to transmit another second random access preamble after a predetermined time, if the MAC entity received the indication from the PHY entity.

7. The UE of claim 5, wherein the MAC entity comprises a first MAC entity responsible for transferring data to the first base station and a second MAC entity responsible for transferring data to the second base station, and wherein a first service area of the first base station is larger than a second service area of the second base station.

* * * * *